(12) United States Patent
DeRose et al.

(10) Patent No.: US 8,379,036 B2
(45) Date of Patent: Feb. 19, 2013

(54) MESH TRANSFER

(75) Inventors: Tony DeRose, San Rafael, CA (US);
Mark Meyer, San Francisco, CA (US);
Tom Sanocki, Berkeley, CA (US); Brian Green, Walnut Creek, CA (US)

(73) Assignee: Pixar, Emeryville, CA (US)

( * ) Notice: Subject to any disclaimer, the term of this patent is extended or adjusted under 35 U.S.C. 154(b) by 1037 days.

(21) Appl. No.: 12/200,704

(22) Filed: Aug. 28, 2008

(65) Prior Publication Data

US 2009/0213131 A1    Aug. 27, 2009

Related U.S. Application Data

(60) Provisional application No. 61/030,796, filed on Feb. 22, 2008.

(51) Int. Cl.
*G09G 5/00* (2006.01)

(52) U.S. Cl. ......... 345/581; 345/419; 345/420; 345/423

(58) Field of Classification Search ........................ None
See application file for complete search history.

(56) References Cited

U.S. PATENT DOCUMENTS

| | | | |
|---|---|---|---|
| 6,256,038 B1 | 7/2001 | Krishnamurthy | |
| 6,738,062 B1 | 5/2004 | Moreton | |
| 7,576,738 B2 * | 8/2009 | Litke et al. | 345/420 |
| 2002/0143419 A1 | 10/2002 | Praun et al. | |
| 2006/0013505 A1 * | 1/2006 | Yau et al. | 382/285 |
| 2006/0267978 A1 | 11/2006 | Litke et al. | |
| 2007/0024632 A1 | 2/2007 | Couture-Gagnon | |
| 2007/0176923 A1 | 8/2007 | Lee et al. | |
| 2010/0053172 A1 * | 3/2010 | DeRose et al. | 345/473 |

FOREIGN PATENT DOCUMENTS

| | | |
|---|---|---|
| WO | WO 2007/087445 A2 | 8/2007 |
| WO | WO 2007/087445 A3 | 8/2007 |

OTHER PUBLICATIONS

Eck, M. et al., "Multiresolution Analysis of Arbitrary Meshes," *SIGGRAPH '95: Proceedings of the 22nd Annual Conferences on Computer Graphics and Interactive Techniques*, ACM Press, pp. 173-182.
Floater, M.S. et al., "Surface Parameterization: a Tutorial and Survey," *Advances in Multiresolution for Geometric Modeling*, N.A. Dodgson et al. (eds.), Springer: Berlin, pp. 157-186.
International Search Report mailed on Dec. 2, 2008, for International Application No. PCT/US08/76547 filed on Sep. 16, 2008. 2 pages.
Joshi, P. et al., "Harmonic Coordinates for Character Articulation," *ACM Transactions on Graphics*, Jul. 2007, vol. 26, No. 3, Article 71, pp. 71-1-71-9.

(Continued)

*Primary Examiner* — Antonio A Caschera
(74) *Attorney, Agent, or Firm* — Kilpatrick Townsend & Stockton LLP

(57) ABSTRACT

Mesh data and other proximity information from the mesh of one model can be transferred to the mesh of another model, even with different topology and geometry. A correspondence can be created for transferring or sharing information between points of a source mesh and points of a destination mesh. Information can be "pushed through" the correspondence to share or otherwise transfer data from one mesh to its designated location at another mesh. Correspondences can be authored on a source mesh by drawing or placing one or more geometric primitives (e.g., points, lines, curves, volumes, etc.) at the source mesh and corresponding geometric primitives at the destination mesh. A collection of "feature curves" may be placed to partition the source and destination meshes into a collection of "feature regions" resulting in partitions or "feature curve networks" for constructing correspondences between all points of one mesh and all points of another mesh.

26 Claims, 12 Drawing Sheets

OTHER PUBLICATIONS

Kähler, K. et al., "Head shop: Generating animated head models with anatomical structure," *Proceedings of the 2002 ACM SIGGRAPH/Eurographic Symposium on Computer Animation*, 2002, 9 pages.

Lee, A.W.F. et al., "Multiresolution Mesh Morphing," *SIGGRAPH 99: Proceedings of the 26th Annual Conference on Computer Graphics and Interactive Techniques*, ACM Press/Addison-Wesley Publishing Co., pp. 343-350.

Praun, E. et al., "Consistent Mesh Parameterizations," *SIGGRAPH 2001 Proceedings of the 28th Annual Conference on Computer Graphics and Interactive Techniques*, ACM Press, pp. 179-184.

Fratarcangeli et al., "Facial motion cloning with radial basis function in MPEG-4 FBA," Graphical Models, 2007, vol. 69, pp. 106-118.

Supplementary European Search Report, dated Mar. 1, 2012, EP Application No. 08872600.5.

Kraevoy et al., "Matchmaker: constructing constrained texture maps," ACM Transaction on Graphics, 2003, vol. 22, pp. 326-333.

Kraevoy, et al., "Cross-parameterization and compatible remeshing of 3D models," 2004, ACM Transactions on Graphics, vol. 23, No. 3, pp. 861-869, Proceedings of SIGGRAPH 2004.

\* cited by examiner

MESH TRANSFER

CROSS-REFERENCES TO RELATED APPLICATIONS

This application claims priority to and the benefit of U.S. Provisional Patent Application No. 61/030,796, filed Feb. 22, 2008 and entitled "Transfer of Rigs with Temporal Coherence," the entire disclose of which is incorporated herein by reference for all purposes.

This application may be related to the following commonly assigned applications:

U.S. patent application Ser. No. 12/200,719, filed Aug. 28, 2008 and entitled "Mesh Transfer Using UV-Space."

U.S. patent application Ser. No. 12/200,727, filed Aug. 28, 2008 and entitled "Mesh Transfer in N-D Space."

U.S. patent application Ser. No. 12/200,739, filed Aug. 28, 2008 and entitled "Mesh Transfer for Shape Blending."

The respective disclosures of these applications are incorporated herein by reference in their entirety for all purposes.

BACKGROUND

This disclosure relates to computer animation and computer generated imagery. More specifically, this disclosure related to techniques for transferring information from one computer model to another.

With the wide-spread availability of computers, animators and computer graphics artists can rely upon computers to assist in the animation and computer generated imagery process. This may include using computers to have physical models be represented by virtual models in computer memory. This may also include using computers to facilitate animation, for example, by the designing, posing, deforming, coloring, painting, or the like, of characters or other elements of a computer animation display.

Pioneering companies in the computer-aided animation/computer generated imagery (CGI) industry can include Pixar. Pixar is more widely known as Pixar Animation Studios, the creators of animated features such as "Toy Story" (1995) and "Toy Story 2" (1999), "A Bugs Life" (1998), "Monsters, Inc." (2001), "Finding Nemo" (2003), "The Incredibles" (2004), "Cars" (2006), "Ratatouille" (2007), and others. In addition to creating animated features, Pixar develops computing platforms specially designed for computer animation and CGI, now known as RenderMan®. RenderMan® is now widely used in the film industry and the inventors have been recognized for their contributions to RenderMan® with multiple Academy Awards®.

One core functional aspect of RenderMan® software can include the use of a "rendering engine" to convert geometric and/or mathematical descriptions of objects or other models into images. This process is known in the industry as "rendering." For movies or other features, a user (e.g., an animator or other skilled artist) specifies the geometric description of a model or other objects, such as characters, props, background, or the like that may be rendered into images. An animator may also specifying poses and motions for objects or portions of the objects. In some instances, the geometric description of objects may include a number of animation variables (avars), and values for the avars.

The production of animated features and CGI may involve the extensive use of computer graphics techniques to produce a visually appealing image from the geometric description of an object or model that can be used to convey an element of a story. One of the challenges in creating models for use in animated features can be balancing the desire for a visually appealing image of a character or other object with the practical issues involved in allocating the computational resources required to produce those visually appealing images. Often the geometric descriptions of objects or models at various stages in a feature film production environment may be rough and course, lacking the realism and detail that would be expected of the final production.

One issue with the production process is the time and effort involved when an animator undertakes to create the geometric description of a model and the models associated avars, rigging, shader variables, paint data, or the like. Even with models that lack the detail and realism expected of the final production, it may take several hours to several days for an animator to design, rig, pose, paint, or otherwise prepare the model for a given state of the production process. Further, although the model need not be fully realistic at all stages of the production process, it can be desirable that the animator or artist producing the model be able to modify certain attributes of the model at any stage. However, modifying the model during the production process may also involved significant time and effort. Often, there may not be sufficient time for desired modifications in order to maintain a release schedule.

Accordingly, what is desired is to solve problems relating to transferring information between meshes, some of which may be discussed herein. Additionally, what is desired is to reduce drawbacks related to transferring information between meshes, some of which may be discussed herein.

SUMMARY

In various embodiments, data and other information from one model can be transferred to another model. A correspondence between meshes of the models can be created that provides a transfer or sharing of information to include all points of one mesh and all points of the other mesh. Mesh information and other proximity data from the mesh of one model can be "pushed through" the correspondence to transfer the data to its designated location at the mesh of the other model.

The correspondence between each of the meshes can enable animators and other digital artists to create new characters from existing characters that may have different topologies and geometries. Additionally, the correspondence may be created between different versions of the same character, thereby allowing the animator to implement changes to characters at later stages of the production process and transfer information from prior versions thereby preserving previous work product and reducing the time and cost of updating the characters.

In some embodiments, correspondences for sharing or transferring information between meshes can be generated based on a pair of feature curve networks. A correspondence can be authored on a source mesh by drawing or placing one or more geometric primitives (e.g., points, lines, curves, volumes, etc.) at the source mesh and corresponding geometric primitives at a destination mesh. For example, a collection of "feature curves" may be placed on each of the source and destination meshes to partition the source and destination meshes into a collection of "feature regions" at "features" or other prominent aspects of the model, such as eyes, noses, or lips. The resulting partitions forming "feature curve networks" can be used to construct a full correspondence between all points of the source mesh and all points of the destination mesh.

In further embodiments, feature curve networks forming the resulting partitions may be different from three sided polygons (e.g., different from triangles), which may commonly be used to create meshes. At least one region associated with the source mesh or the destination mesh may be bounded by more than three feature curves in the pair of feature curve networks. At least one region associated with the source mesh or the destination mesh may be bounded by less than three feature curves in the pair of feature curve networks. The correspondence may be generated based on the pair of feature curve networks where regions associated with the source mesh or the destination mesh are bounded by less than three or more than three feature curves.

In some embodiments, at least one feature curve may be defined by at least one point that lies within the interior of a face associated with either the source mesh or the destination mesh. A pair of feature curve networks may include one or more user-defined feature curves. Feature curves associated with a pair of feature curve networks may be inferred from other parameterizations of a source or destination mesh.

In still further embodiments, a correspondence between a source mesh and a destination mesh can be created or generated based on one or more harmonic functions. The correspondence may be generated such that data corresponding to a first point at or near the source mesh may be shared or transferred to a second point at or near destination mesh. The information sharing between two or more meshes may unidirectional or bidirectional based on the correspondence. Thereby, information may be shared between two or more meshes, such as scalar fields, variables, controls, avars, articulation data, character rigging, shader data, lighting data, paint data, simulation data, topology and/or geometry, re-meshing information, map information, or the like.

In one embodiment, a computer-implemented method may be provided for generating correspondences for transferring information between objects. A first mesh or mesh object may be created, loaded, or otherwise received. A second mesh or mesh object may be created, loaded, or otherwise received. A pair of feature curve networks then may be created or received. At least one region of the first mesh or at least one region of the second mesh may be bounded by more than three or less than three feature curves in the pair of feature curve networks. A correspondence between the first and second meshes may then be generated or otherwise established based on the pair of feature curve networks.

In yet another embodiment, a correspondence may be generated between the first mesh and the second mesh using one or more harmonic functions. In a further embodiment, a correspondence may be generated based on a pair of feature curve networks where at least one feature curve in the pair of feature curve networks is defined by a point that lies in the interior of a face associated with one of a first mesh or a second mesh.

A further understanding of the nature, advantages, and improvements offered by those inventions disclosed herein may be realized by reference to remaining portions of this disclosure and any accompanying drawings.

BRIEF DESCRIPTION OF THE DRAWINGS

In order to better describe and illustrate embodiments and/or examples of any inventions presented within this disclosure, reference may be made to one or more accompanying drawings. The additional details or examples used to describe the accompanying drawings should not be considered as limitations to the scope of any of the disclosed inventions, any of the presently described embodiments and/or examples, or the presently understood best mode of any invention presented within this disclosure.

DETAILED DESCRIPTION OF EXEMPLARY EMBODIMENTS

Techniques and tools can be implemented that assist in the production of computer animation and computer graphics imagery. A mesh can be the structure that gives shape to a model. The mesh of a model may include, in addition to information specifying vertices and edges, various additional pieces of information. In various embodiments, point weight groups, shader variables, articulation controls, hair variables and styles, paint data, or the like, can be shared between meshes having different topologies and geometries. Information associated with the mesh of one character can be shared with or transferred to the mesh of another character, even from one character to another completely different character and between different versions of the same character.

A correspondence build between a source mesh and a destination mesh can provide the sharing of information on, at, or near one mesh to designated locations of another mesh. The correspondence may be constructed between all points on surfaces of the meshes, rather than merely mesh vertices alone. In various embodiments, the correspondences may be authored by drawing out points, lines, curves, etc. on a source mesh and associated points, lines, curves, etc. on a destination mesh. These may correspond to features or other prominent aspects of models provide by the meshes. Regions created by authoring on the meshes can be parameterized such that a full correspondence is created between all points of the source mesh and all points of the destination mesh, without requiring identical topologies and/or geometries.

Figure 1:
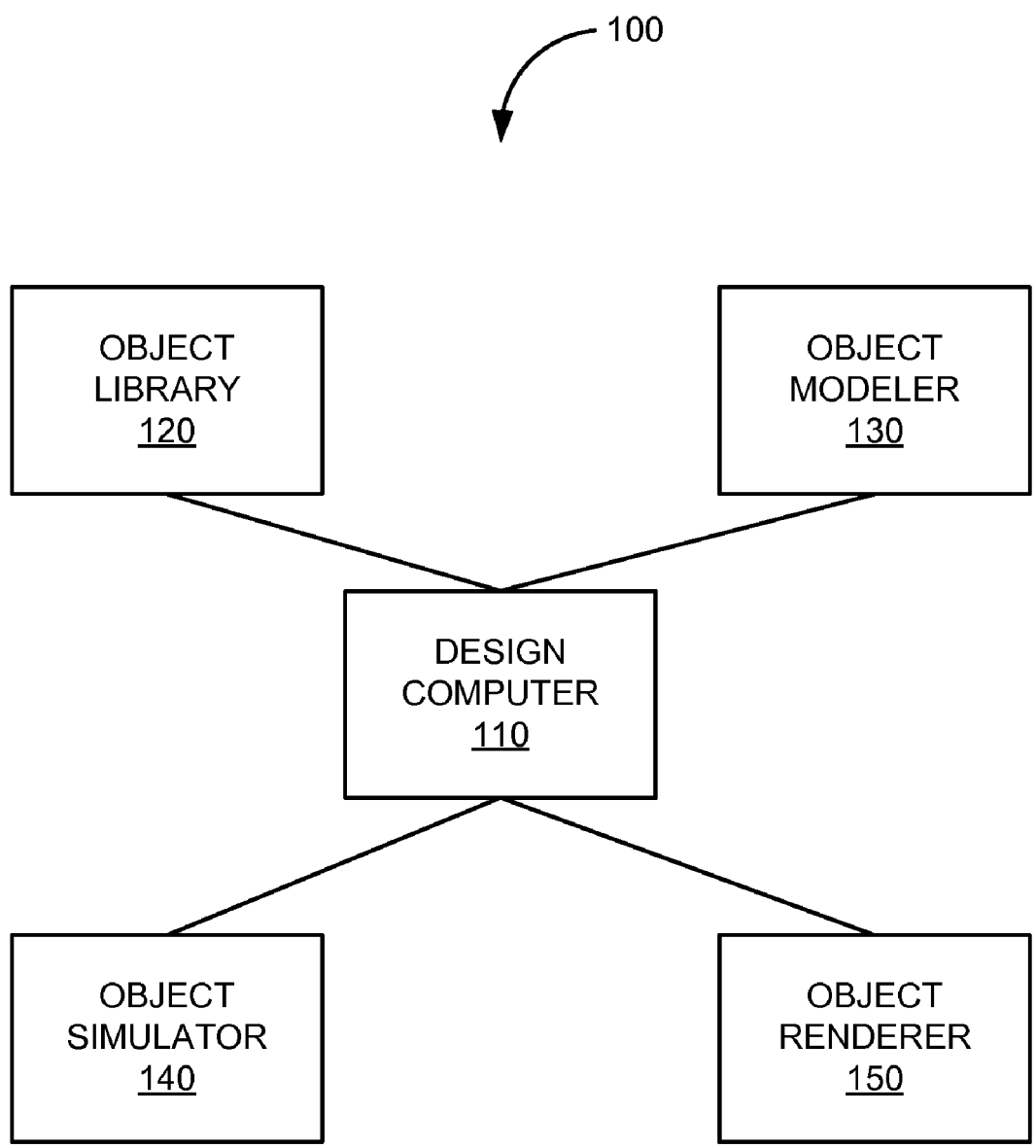
FIG. 1 is a simplified block diagram of a system for creating computer animations and computer graphics imagery that may implement or incorporate various embodiments of an invention whose teachings may be presented herein.

FIG. 1 is a simplified block diagram of system 100 for creating computer animations and computer graphics imagery that may implement or incorporate various embodiments of an invention whose teachings may be presented herein. In this example, system 100 includes design computer 110, object library 120, object modeler 130, object simulator 140, and object render 150.

Design computer 110 can be any PC, laptop, workstation, mainframe, cluster, or the like. Object library 120 can be any database configured to store information related to objects that may be designed, posed, animated, simulated, rendered, or the like.

Object modeler 130 can be any hardware and/or software configured to model objects. Object modeler 130 may generate 2-D and 3-D object data to be stored in object library 120. Object simulator 140 can be any hardware and/or software configured to simulate objects. Object simulator 140 may generate simulation data using physically-based numerical techniques. Object renderer 150 can be any hardware and/or software configured to render objects. For example, object renderer 150 may generate still images, animations, motion picture sequences, or the like of objects stored in object library 120.

Figure 2:
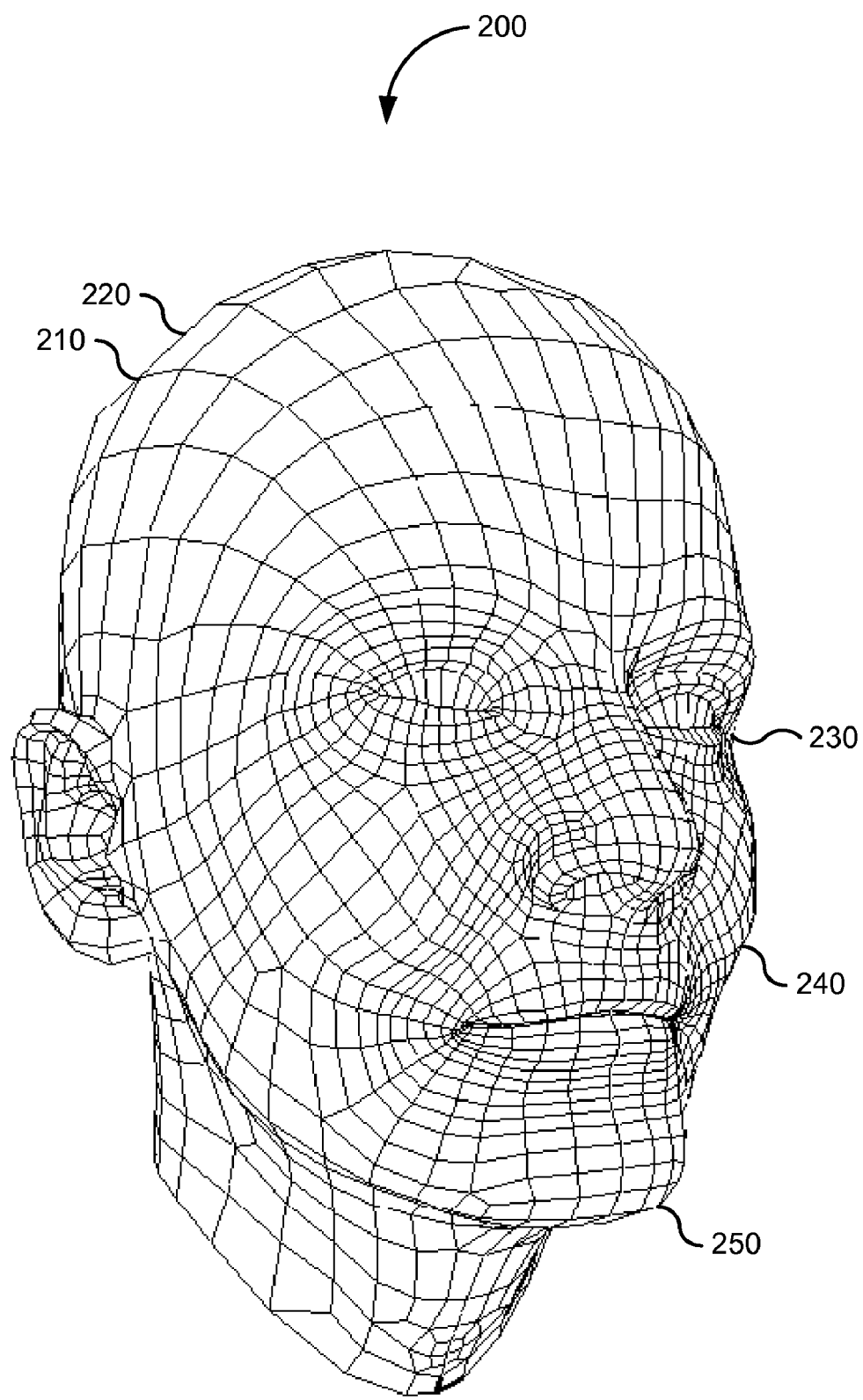
FIG. 2 is an illustration of a mesh for a head of a human character.

FIG. 2 is an illustration of mesh 200 for a head of a human character model in one embodiment. Mesh 200 can be created or modeled as a collection of faces (e.g., triangles, quadrilaterals, or other polygons), formed by interconnecting a collection of vertices. In this example, a collection of polygons interconnect at vertex 210. Polygons may interconnect at vertex 210 to share an edge (e.g., edge 220). Any number of polygons and vertices may be used to form mesh 200. The number of polygons may be dependent on user preference, the desired topology, geometry, realism, detail, or the like.

Motion of a model associated with mesh 200 may be realized by controlling mesh 200, for example by controlling vertices 230, 240, and 250. Polygons and vertices of mesh 200 may be individually animated by moving their location in space (x, y, z) for each displayed frame of a computer animation. Polygons and vertices of mesh 200 may also move together as group, maintaining constant relative position. Thus, for example, by raising vertices of mesh 200 by appropriate amounts at the corners of lips on the head of the human character, a smiling expression can be formed. Similarly, vertices of mesh 200 located at or near features or other prominent aspects of the model created by mesh 200, such as eyebrows, cheeks, forehead, etc. may be moved to deform the head of the human character to form a variety of expressions.

In addition to controlling character deformations, information can be "attached to" mesh 200 to provide other functional and/or decorative purposes. For example, mesh 200 may be connected to skeletons, character rigging, or other animations controls and avars used to animate, manipulate, or deform the model via mesh 200. Further, fields of data and/or variables specifying color, shading, paint, texture, etc. can be located at certain vertices or defined over surfaces of mesh 200. As discussed above, constructing mesh 200 and placing all of this information on mesh 200 can be a time consuming process. This process may limit how many characters or other objects may be created, the topologies and geometries of those models, and what changes can be made during various stages in the production of animations, such as feature-length films.

Figure 3A:
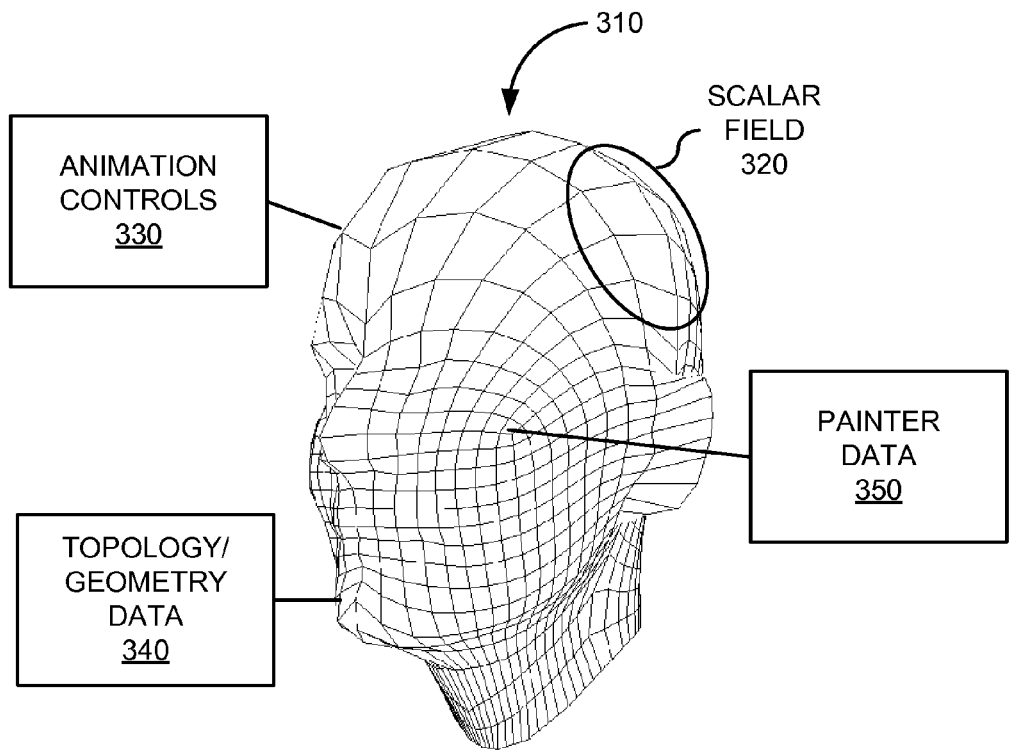
FIG. 3A is an illustration a mesh including various pieces of associated information.

FIG. 3A is an illustration mesh 310 including various pieces of associated information. Mesh 310 can include scalar field 320, animations controls 330, topology/geometry data 340, and painter data 350. Scalar field 320 may include a distribution of values or variables over a portion of mesh 310. The values or variables associated with scalar field 320 may include shader variables, point weight groups, the location of hair/fur objects, or the like. Topology/geometry data 340 may include information that defines or describes a locality in terms of its layout, structure, or level of detail. Painter data 350 may include information, such as coloring and textures, placed by an animator or designer at a specific location on mesh 310.

In various embodiments, new models can be created and existing models can be more readily updated using techniques of this disclosure that allow animators to overcome some of the timing constraints involved in creating models. Additionally, the time and effort put into designing one model can be preserved allowing the prior work and effort performed by the animator to be shared with or copied to another model. In some embodiments, a correspondence can be created that allows information present at or on a mesh to be shared with another mesh. The correspondence can reduce the time required to create new models, or the update existing models at later stages of the production process. Thus, animation controls, rigging, shader and paint data, etc. can be authored once on a character, and shared or transferred to different version of the same character or to another character of completely different topology and geometry.

In the example of FIG. 3A, mesh 310 may represent an initial or preliminary version of a character. For example, mesh 310 may include a number of polygons that provide a character with just enough detail with which an animator, designer, or other graphics artist may work. The number of polygons may be relatively small compared to the number of polygons for a final or production version of the character having lifelike or the final desired detail and/or realism. The relatively small size of mesh 310 may allow the character associated with mesh 310 to be quickly posed, animated, rigged, painted, or rendered in real-time, allowing an animator to see quick results early in production process.

Figure 3B:
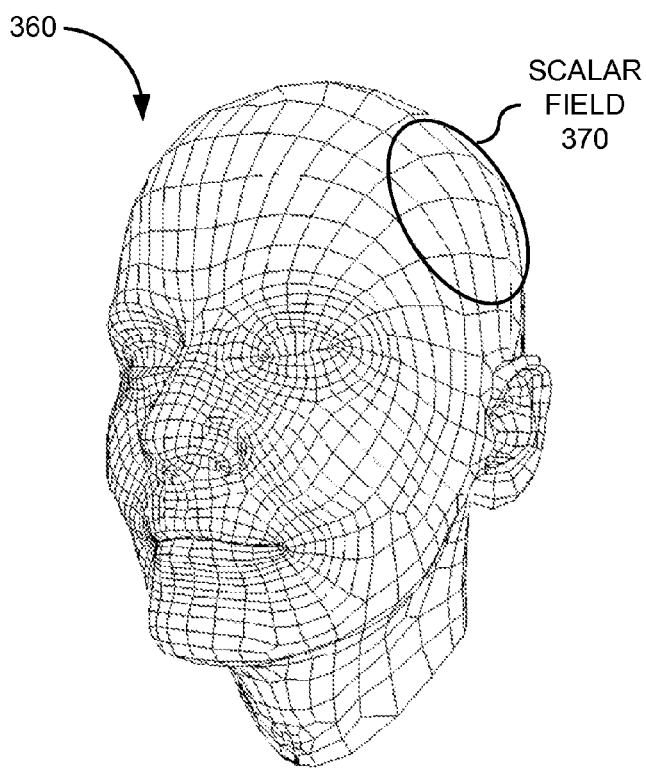
FIG. 3B is an illustration of a mesh in various embodiments with which information associated with the mesh of FIG. 3A may be shared.

Referring to FIG. 3B, mesh 360 may represent a production or final version of the character. Mesh 360 may include a relatively higher or larger number of polygons with respect to initial or preliminary versions of the character to provide more realistic detail in each rendered frame. In this example, mesh 360 can include scalar field 370. Scalar field 370 may be identical to, similar to, or otherwise include some relationship with scalar field 320. For example, both may represent how the head of the character is to be shaded or how hair is to be placed.

In various embodiments, one or more correspondences may be created that allow information associated with mesh 310 to be readily shared with or transferred to mesh 360. Scalar field 320, animations controls 330, topology/geometry data 340, and/or painter data 350 can be "pushed" through a correspondence between mesh 310 and mesh 360. For example, scalar field 320 can be transferred to mesh 360 to create scalar field 370. Thus, once correspondences are created between meshes, any information at or on one mesh may be shared with another mesh. This can allow sharing of information even if one mesh includes differing topologies and geometries from other meshes.

Figure 4:
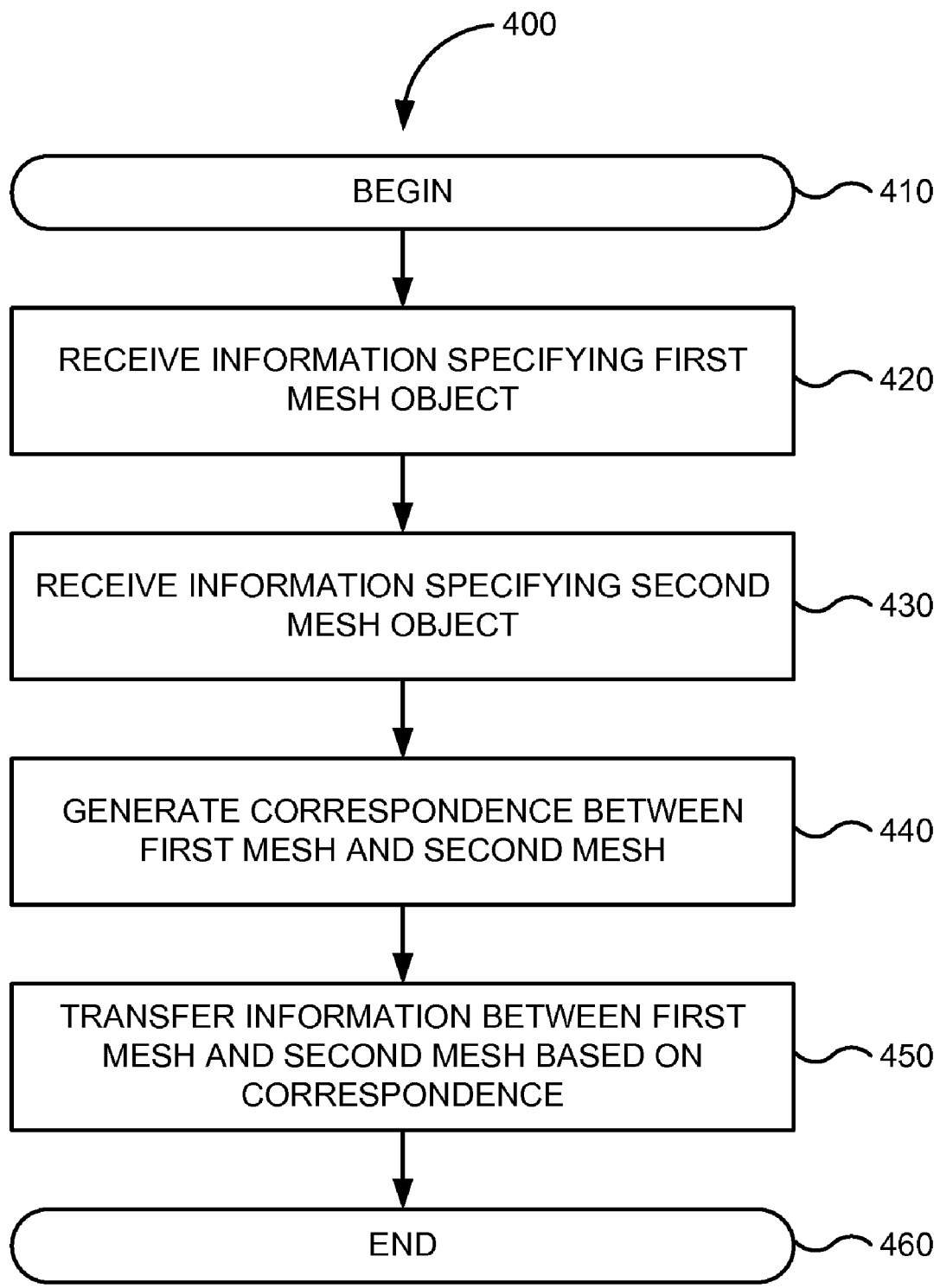
FIG. 4 is a simplified flowchart of a method in various embodiments for generating a correspondence between meshes for sharing information between the meshes.

FIG. 4 is a simplified flowchart of method 400 in various embodiments for generating a correspondence between meshes for sharing information between the meshes. The processing depicted in FIG. 4 may be performed by software modules (e.g., instructions or code) executed by a processor of a computer system, by hardware modules of an electronic device, or combinations thereof. FIG. 4 begins in step 410.

In step 420, information is received specifying a first mesh. The information may define the first mesh to include a single integral mesh or to include a collection of connected meshes. As discussed above, the first mesh may include a collection of polygons, interconnected at vertices, that form the topology and/or geometry of a model. The information may further specify variables, controls, fields, rigging, color/lighting data, or the like.

In step 430, information is received specifying a second mesh. The second mesh may have the same or different topology or geometry of the first mesh. For example, the second mesh may include the same number of polygons as the first mesh, a different number of polygons, different types of polygons, or the like. The second mesh may already include mesh information, such as character rigging, scalar fields, shader variables, or the like.

In step 440, a correspondence is generated between the first mesh and the second mesh. The correspondence can include functions, relationships, correlations, etc. between one or more points associated with the first mesh and one or more points associated with the second mesh. The correspondence may include a mapping from every location on or within a space near the first mesh to a unique location on or near the second mesh. The correspondence may map one or more points, curves, surfaces, regions, objects, or the like, associated with the first object to one or more points, curves, surfaces, regions, objects, or the like associated with the second object.

In various embodiments, a parameterization is built for source and destination meshes over a common domain. This common parameter domain can then be used to build a global and continuous correspondence between all points of the source and destination surfaces. The basic framework of the parameterization may rely on user-supplied points, user-supplied curves, inferred discontinuities, or the like. In some embodiments, the parameterization may include a set of feature curves defining a feature curve network.

In step 450, information is transferred between the first mesh and the second mesh based on the correspondence. The information may include character rigging, topology data, geometry data, shader variables, hair objects, information or objects within a proximity to either mesh, painter data, or the like. The transfer may occur from the first mesh to the second mesh. The transfer may also occur from the second mesh to the first mesh.

The creation of correspondences between meshes, and the transfer of information can be applied to a range of applications. For example, information may be shared between characters. As mentioned above, without requiring a common mesh topology, sharing can be accomplished between meshes with far more topological flexibility. In another example, the flexibility of evolving characters may be achieved. As the design of a character evolves, the geometry and mesh topology of the character may change. Even in early stages of a production, such changes can be expensive since point weight groups, shader variables, hair style parameters, or the like, may need to be redefined to meet to needs of production changes, costs, artistic developments, or the like.

In yet another example, the level of detail of a character may change. The source mesh can be the full resolution character, and the destination mesh may a low resolution mesh. The low resolution mesh may be used to pose and display the character more efficiently. In a further example, morphing between a pair of shapes may utilize a continuous correspondence generated between surfaces. In yet a further example, by using morphing localized to defined regions, it may be possible to design new characters by locally blending between basis shapes taken from a standardized catalog. FIG. 4 ends in step 460.

Figure 5:
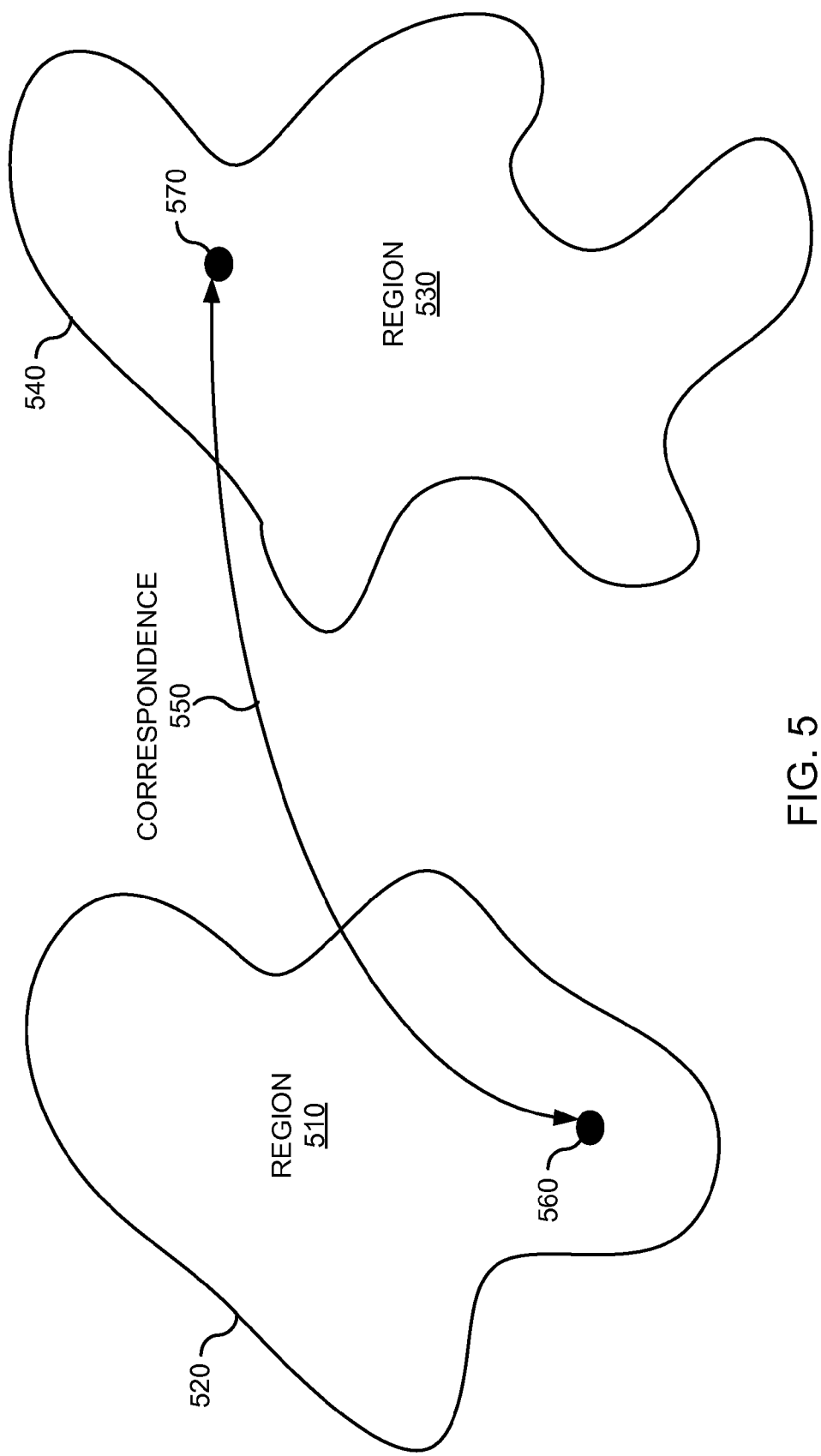
FIG. 5 is an illustration of a correspondence between a first region and a second region in some embodiments.

FIG. 5 is an illustration of a correspondence between a first region and a second region. In this example, region 510 is defined by boundary 520 and region 530 is defined by boundary 540. Region 510 and 530 can include location and area. For example, region 510 may be located at, on, or near mesh 310 of FIG. 3 and include a point or a non-zero area. Boundary 520 and 540 can include one or more geometric primitives, such as points, lines, curves, volumes, or the like. Correspondence 550 may be created in various embodiments to transfer information associated with point 560 that lies within region 510 to be associated with or mapped to point 570 that lies within region 530. Correspondence 550 may provide unidirectional or bidirectional information sharing. Information, thus, can be "pushed through" correspondence 550 to be shared between region 510 and region 530.

Consider an example, given a source mesh M (e.g., mesh 310) equipped with a collection of scalar fields $f_1 \ldots f_n$, and a destination mesh M' (e.g., mesh 360), the scalar fields may be transferred to M' in a feature preserving way. That is, scalar fields $f'_1 \ldots f'_n$ may be constructed on M'. The fields may be constructed using equation (1):

$$f'_i(p') = f_i(C(p')) \qquad (1)$$

In equation (1), C can be a correspondence between M and M'. For example, $C: M' \rightarrow M$ may be a "feature preserving" map (e.g., a homeomorphism or special isomorphism between topological spaces which respects topological properties) from M' to M. C can be feature preserving in that the correspondence carries "important features" of M' to their corresponding features on M.

In some embodiments, the notion of important features can be captured by a user-specified collection of geometric primitives or "feature curves." The user may draw or otherwise place points, lines, curves, volumes, or other n-dimensional objects on or near a mesh. Curves may provide certain degrees of flexibility, thus, we refer to the collection of primitives as feature curves. These feature curves may form a network that partitions a mesh into a set of regions or "feature regions" (e.g., regions 510 and 530 formed by boundaries 520 and 540, respectively). A feature region may include a region topologically equivalent to a disk.

As discussed above, features may include any prominent aspect of an object or model. For example, features may include characteristic parts of a person's face, such as eyes, nose, lips, ears, or like. Features may also include a set or collection of attributes, constraints, groupings, contexts, or component. A feature curve may include one or points, lines, curves, planes, volumes, or the like associated with a feature. A feature curve may be combined with one or more other feature curves to create a feature curve region. A feature curve may enclose a feature to form a topological disc. A set of feature curves may form a feature curve network.

For example, let R be a feature region on M that is bounded by m feature curves $c_1 \ldots c_m$. The feature curves may be ordered in counter-clockwise fashion around the region. Similarly, let R' be the corresponding feature region on M' bounded by corresponding feature curves $c'_1 \ldots c'_m$. M may be first parameterized on a regular m-gon $P_m$ in a plane. Curve $c_i$ can be uniformly parameterized on the i-th edge of $P_m$.

Figure 6:
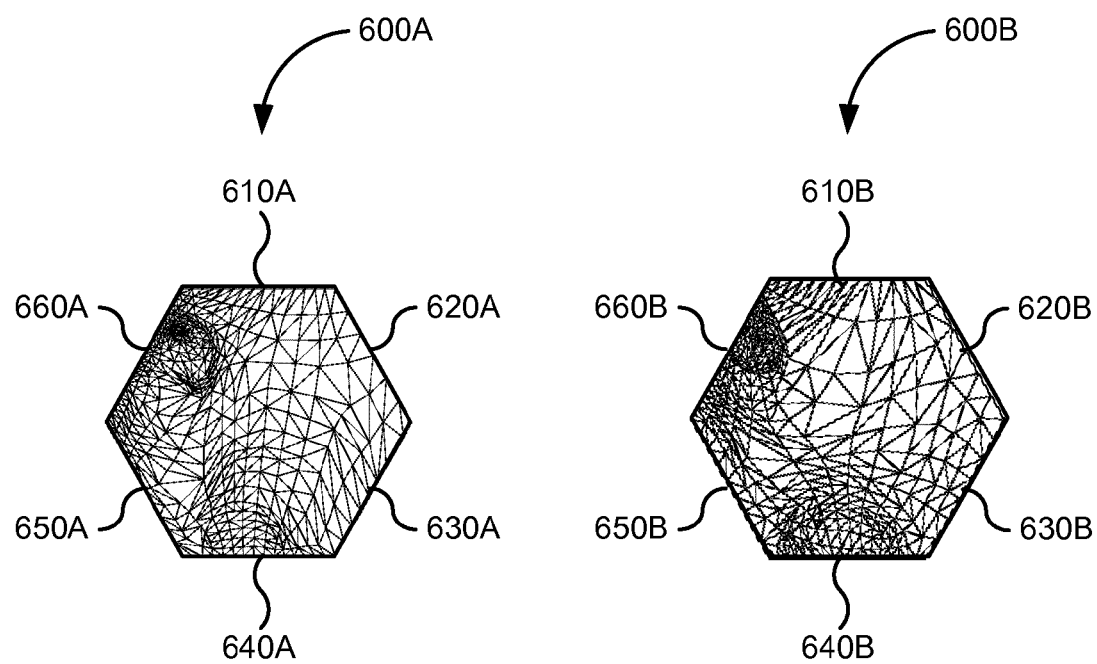
FIG. 6 illustrates a first mesh region and a corresponding second mesh region parameterized over a regular hexagon in one embodiment.

FIG. 6 illustrates mesh region 600A and corresponding mesh region 600B parameterized over a regular hexagon in one embodiment. In this example, mesh region 600A may be bounded by feature curves 610A, 620A, 630A, 640A, 650A, and 660A going counter-clockwise. Since the region can be bounded by six feature curves, the region may be parameterized over a regular hexagon in the common parameter domain $P_6$. Mesh region 600B may be bounded by feature curves 610B, 620B, 630B, 640B, 650B, and 660B going counterclockwise. Since the region is also bounded by six feature curves, the region can be parameterized over the same regular hexagon in the common parameter domain $P_6$.

In other words, if $v_{ik}$ is the k-th vertex of $c_i$ (in counterclockwise order), the image of in the k-th vertex in the parameter domain can be located according to equation (2):

$$\frac{p_i(1-k) + kp_{i+1}}{|c_i|} \qquad (2)$$

In equation (2), $|c_i|$ can denote the number of vertices in $c_i$, and $p_1 \ldots p_m$ can denote the vertices of $P_m$. The parametric images of the remaining vertices of the region can be determined, e.g., by minimizing harmonic distortion subject to these boundary conditions. This defines a parameterization $\phi:P_m \to R$.

The region R' can be similarly parameterized over Pm to create a parameterization $\phi':P_m \to R'$. The feature preserving map C mentioned above is then given by equation (3):

$$C(p'):=\phi \circ \phi'^{-1}(p') \qquad (3)$$

Accordingly, the common parameter domain Pm can be used to build a global and continuous correspondence between all points of the source and destination surfaces. Based on the correspondence, information can be shared between the source and destination. In various embodiments, information may be shared between characters, providing the flexibility of evolving characters, sharing of geometry and mesh topology, sharing of point weight groups, shader variables, hair style parameters, or the like. In yet a further example, by using morphing localized to defined regions, it may be possible to design new characters by locally blending between basis shapes taken from a standardized catalog.

Figure 7:
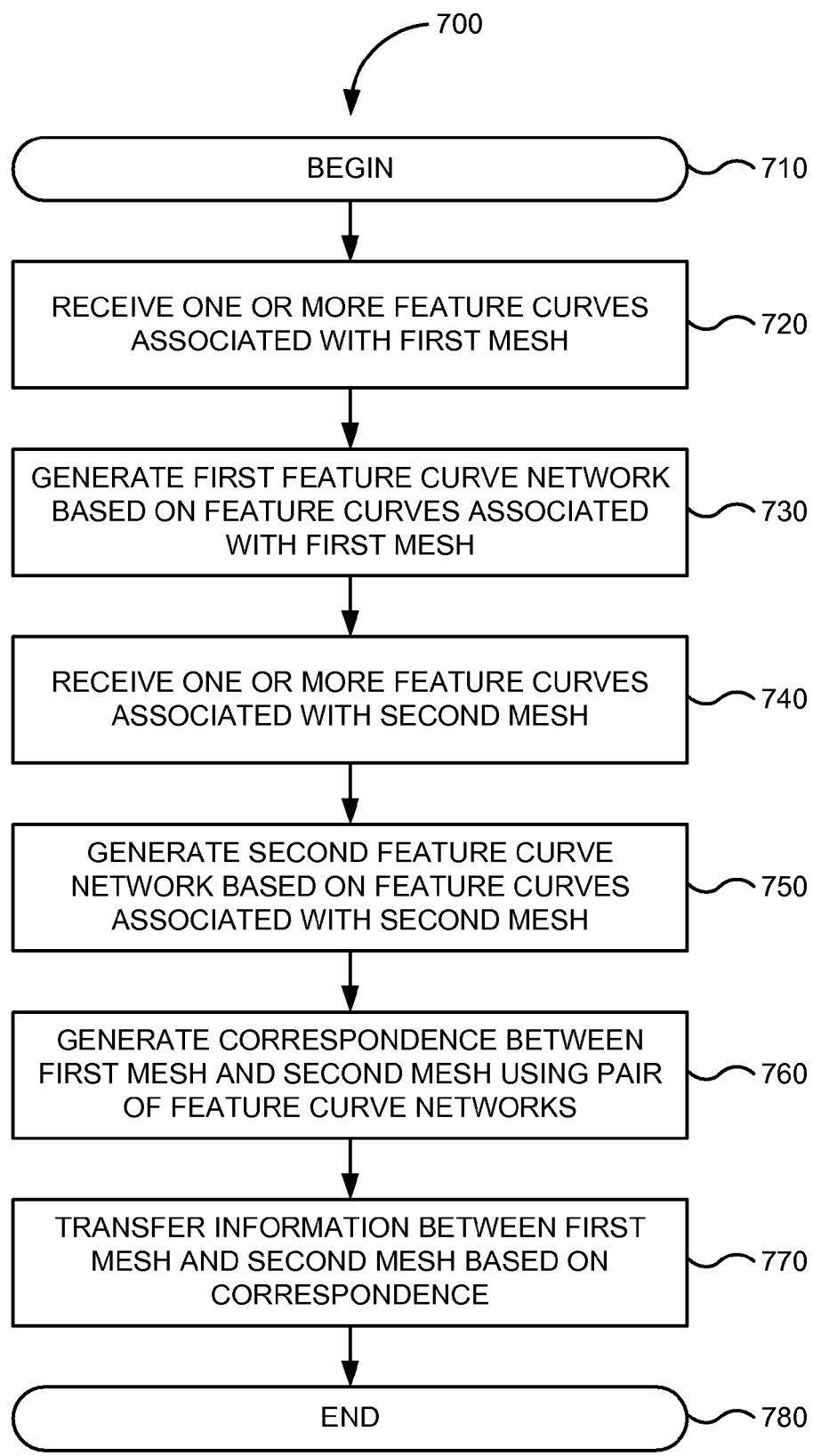
FIG. 7 is a flowchart of a method in various embodiments for transferring information between meshes using feature curve networks.

FIG. 7 is a flowchart of method 700 in various embodiments for transferring information between meshes using feature curve networks. FIG. 7 begins in step 710.

In step 720, one or more feature curves associated with a first mesh are received. In one example, a user may manually draw or place one or more curves on the first mesh. In another example, information defining feature curves may be imported or loaded from a file. In yet another example, information defining feature curves may be inferred or otherwise determined from parameterizations associated with the first mesh. Feature curves may be user-authored on a digital object, or placed on a physical object and created when scanning to digitize the physical object. In step 730, a first feature curve network is generated based on feature curves associated with the first mesh.

In step 740, one or more feature curves associated with a second mesh are received. In step 750, a second feature curve network is generated based on the one or more feature curves associated with the second mesh.

In step 760, a correspondence is generated between the first mesh and the second mesh using the pair of feature curve networks (i.e., the first and second feature curve networks). As discussed above, the correspondence can be feature preserving in that the correspondence carries "important features" of the first mesh to their corresponding features on second mesh.

In step 770, information is transferred between the first mesh and the second mesh based on the correspondence. The transfer of information may include a unilateral or bilateral transfer or sharing of information between the first mesh and the second mesh. FIG. 7 ends in step 780.

A variety of methods or tools may be provided for authoring feature curves. In one embodiment, a user may specify a set of feature curves interactively using commonly available selection tools, such as shortest path selection. In yet other embodiments, appropriate when the source mesh has a UV set, feature curves may be inferred from the discontinuities in the UV set.

Figure 8A:
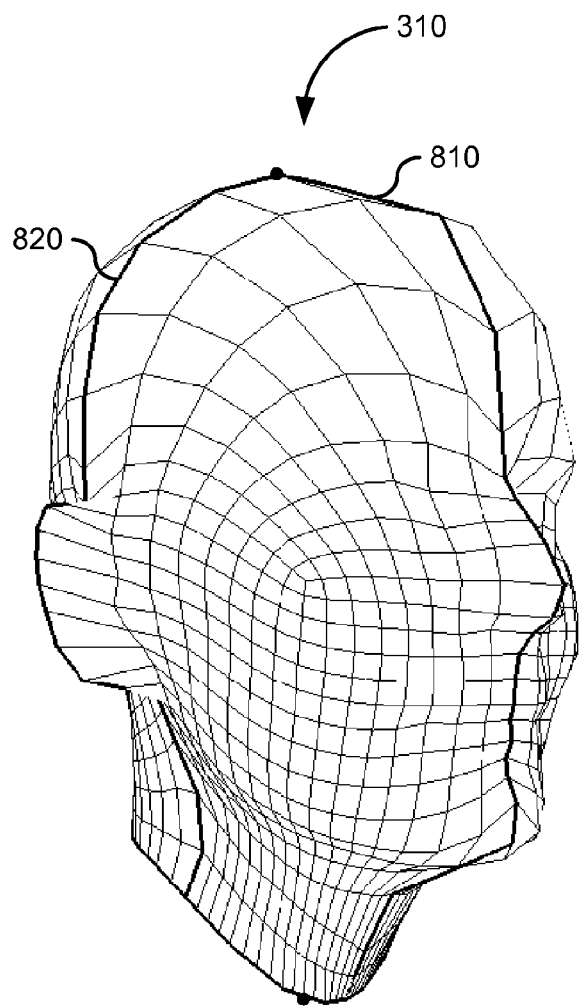
FIGS. 8A and 8B illustrate a mesh including a feature curve network having less than three feature curves that define a region.
Figure 8B:
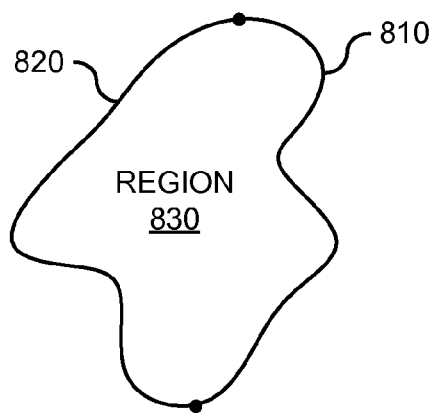

FIGS. 8A and 8B illustrate mesh 310 including a feature curve network having less than three feature curves that define a region in one embodiment. Referring to FIG. 8A, mesh 310 includes feature curves 810 and 820. In this example, a user has drawn feature curve 810 and feature curve 820 on mesh 310. The separation between each feature curve is illustrated by a solid dot near the top of the head and near the base of the neck. In various embodiments, a feature curve may be defined by at least one point that lies within the interior of a face of mesh 310.

Feature curve 810 and 820 can be interconnected to form a feature region. Referring to FIG. 8B, feature region 830 can be defined by feature curve 810 and feature curve 820. A set of feature curve regions on mesh 310 may define a feature curve network.

Figure 9A:
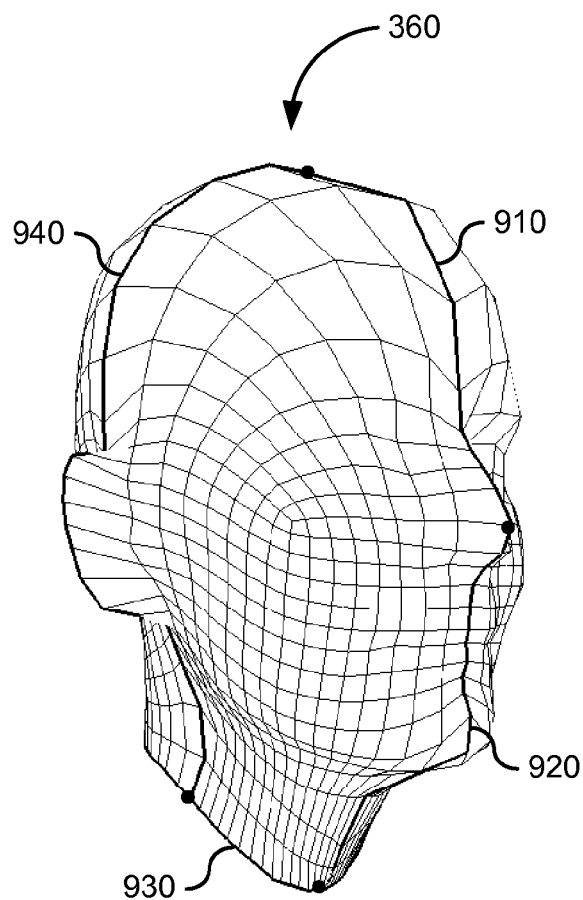
FIGS. 9A and 9B illustrate a mesh including a feature curve network having more than three feature curves that define a region.
Figure 9B:
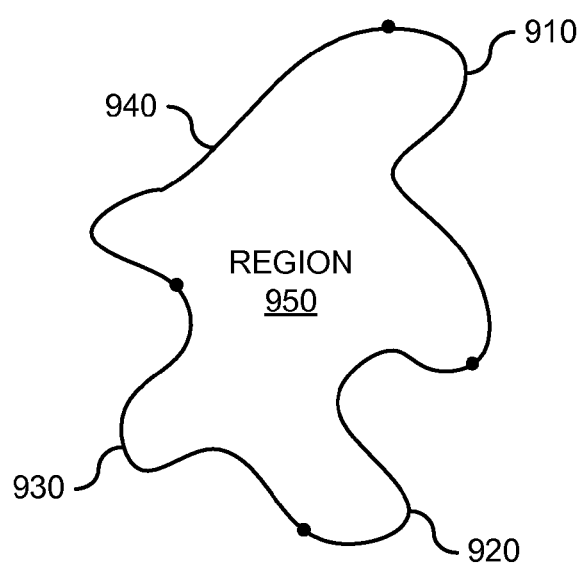

FIGS. 9A and 9B illustrate mesh 310 including a feature curve network having more than three feature curves that define a region. Referring to FIG. 9A, mesh 310 includes feature curves 910, 920, 930, and 940 on mesh 360. The separation between each feature curve is illustrated by a solid dot near the top of the head, on the nose, at the base of the neck, and near the back of the neck. Feature curves 910, 920, 930, and 940 can be interconnected to form a feature region. Referring to FIG. 9B, region 950 can be defined by feature curves 910, 920, 930, and 940.

In some embodiments, having feature curves specified on a source mesh, corresponding feature curves may be constructed on a destination mesh. For example, a user may copy the source feature curves as 3D curves into rough geometric proximity to the destination mesh. Modeling tools can be used to position the vertices of these curves near their corresponding locations on the destination mesh. The repositioned vertices can then be "snapped" onto the destination mesh to produce the destination feature curves.

The correspondence generated by method 700 in various embodiments can provide a reasonably good starting point for most significant features, such as lips, eye brows, and ears if feature curves are appropriately positioned. In some embodiments, the correspondence can be refined to match several finer resolution features, such as nostrils. Feature curve refinement can also be appropriate when the correspondence requires significant adjustment. One way to achieve refinement can be to add new feature curves to more finely partition the meshes into feature regions. In further embodiments, more subtle adjustments can be provided using a lightweight and flexible method of adding additional correspondence constraints to the interior of regions created by feature curves.

Figure 10:
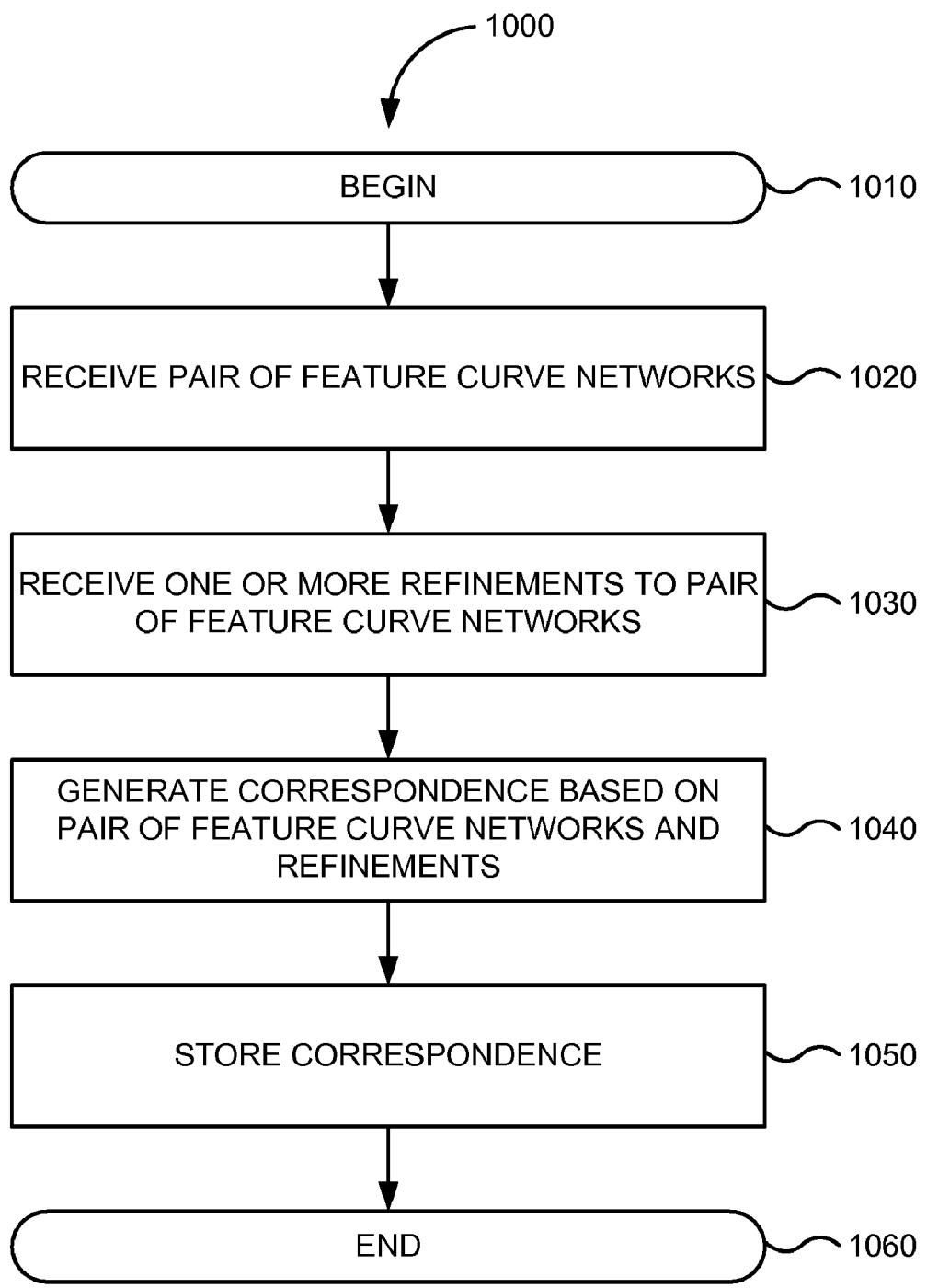
FIG. 10 is a flowchart of a method in various embodiments for generating a correspondence based on refinements to pair of feature curve networks.

FIG. 10 is flowchart of method 1000 in various embodiments for generating a correspondence based on refinements to pair of feature curve networks. FIG. 10 begins in step 1010.

In step 1020, a pair of feature curve networks is received. In step 1030, one or more refinements to the pair of feature curve networks are received. Refinements to the pair of feature curve networks may include adding additional geometric primitives, such as points, lines, curves, volumes, etc. to the interior of feature regions. In one example of a refinement to a pair of feature curve networks, an additional pair of points may be positioned as interior constraints, one on the source, and a corresponding one on the destination.

Figure 11A:
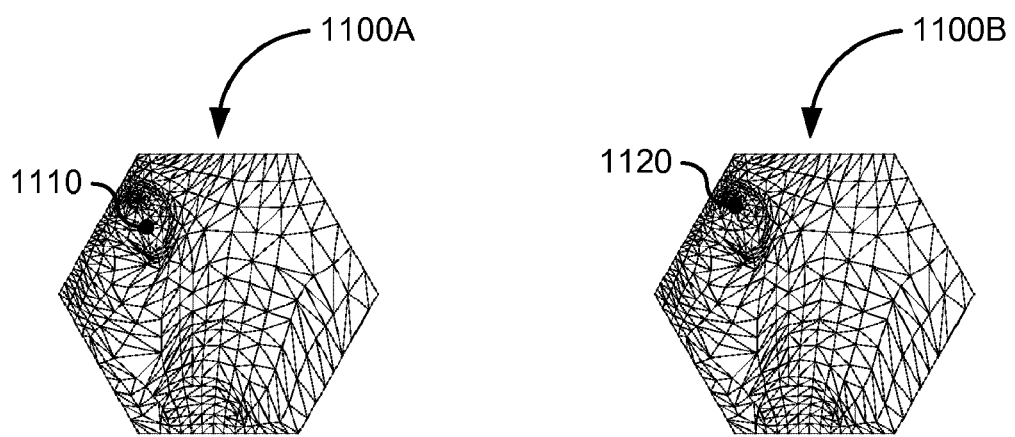
FIGS. 11A and 11B illustrate interior constraints within two corresponding regions in one embodiment.

FIG. 11A illustrates interior constraints within two corresponding regions in one embodiment. Referring to FIG. 11A, mesh region 1100A may be parameterized over a regular hexagon in one embodiment. A corresponding mesh region 1100B may similarly be parameterized over then same regular hexagon in a common parameter domain. In this example, a pair of points may be placed on each mesh region 1100A and 1100B to provide interior constrains to refine the correspondence. For example, the pair of points may be centered in the left nostril of a source mesh and a destination mesh.

The additional points used to specify the constraint need not be located at vertices. Constraints can be arbitrarily located on the source and destination meshes and placed to reside in corresponding feature regions. In some situations, a user may desire to specify several additional constraints per region. In some embodiments, the user may specify corresponding edges, such that the additional constraints form corresponding cell complexes.

Referring again to FIG. 10, in step 1040, a correspondence is generated based on the pair of feature curve networks and the refinements. For example, a refined correspondence that respects any additional interior constraints can be achieved by introducing an intermediate deformation h:Pm→Pm into equation (3) and shown in equation (4):

$$C(p'):=\phi \circ h \circ \phi'^{-1}(p') \qquad (4)$$

In some embodiments, h can be constructed as a two-dimensional harmonic deformation. For example, the cage for h may be the boundary of Pm and the interior cage components correspond to interior and edge constraints. In step 1050, the correspondence is stored. FIG. 10 ends in step 1060.

Figure 11B:
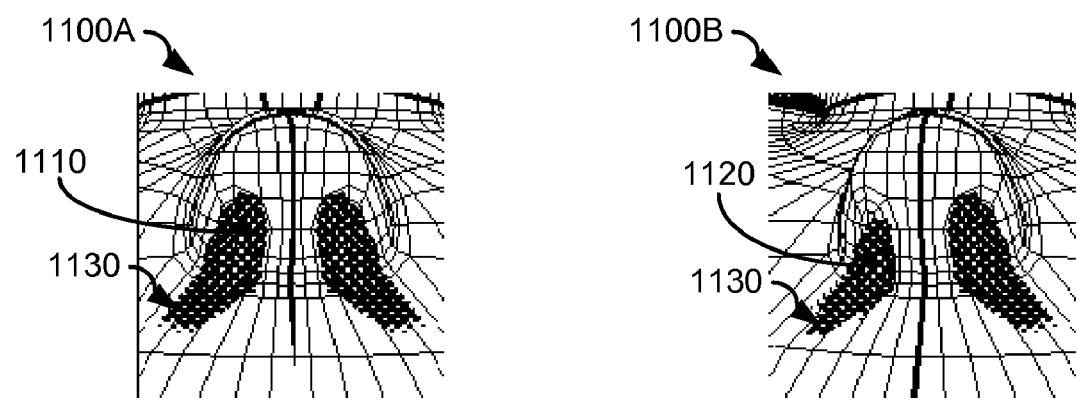

FIG. 11B illustrates results of the interior constraints within the two corresponding regions in one embodiment. In this example, mesh region 1100A can include a scalar field 1130 indicating shader variables for the location of the left nostril of a model. Scalar field 1130 can be pushed through the refined correspondence to mesh region 1100B. Thus, the pair of points 1110 and 1120 can be used to refine the location or look of the location of the left nostril of another model. In this example, point 1120 may be placed to offset or lower the location of the shader variables of the left nostril.

In various embodiments, accordingly, a new robust and controllable method for transferring data between meshes of substantially different topology and geometry can be implemented using feature curves. As discussed above, the input to the basic method can include a source mesh (e.g., possessing a set of scalar fields to be transferred), a network of feature curves on the source mesh, a destination mesh to receive the data, and a corresponding network of feature curves on the destination. From this input, a correspondence can be generated between all continuously varying points of the two surfaces. Information can be shared based on the correspondence, such that each scalar field on the source is mapped through the correspondence to define a scalar field on the destination.

Figure 12:
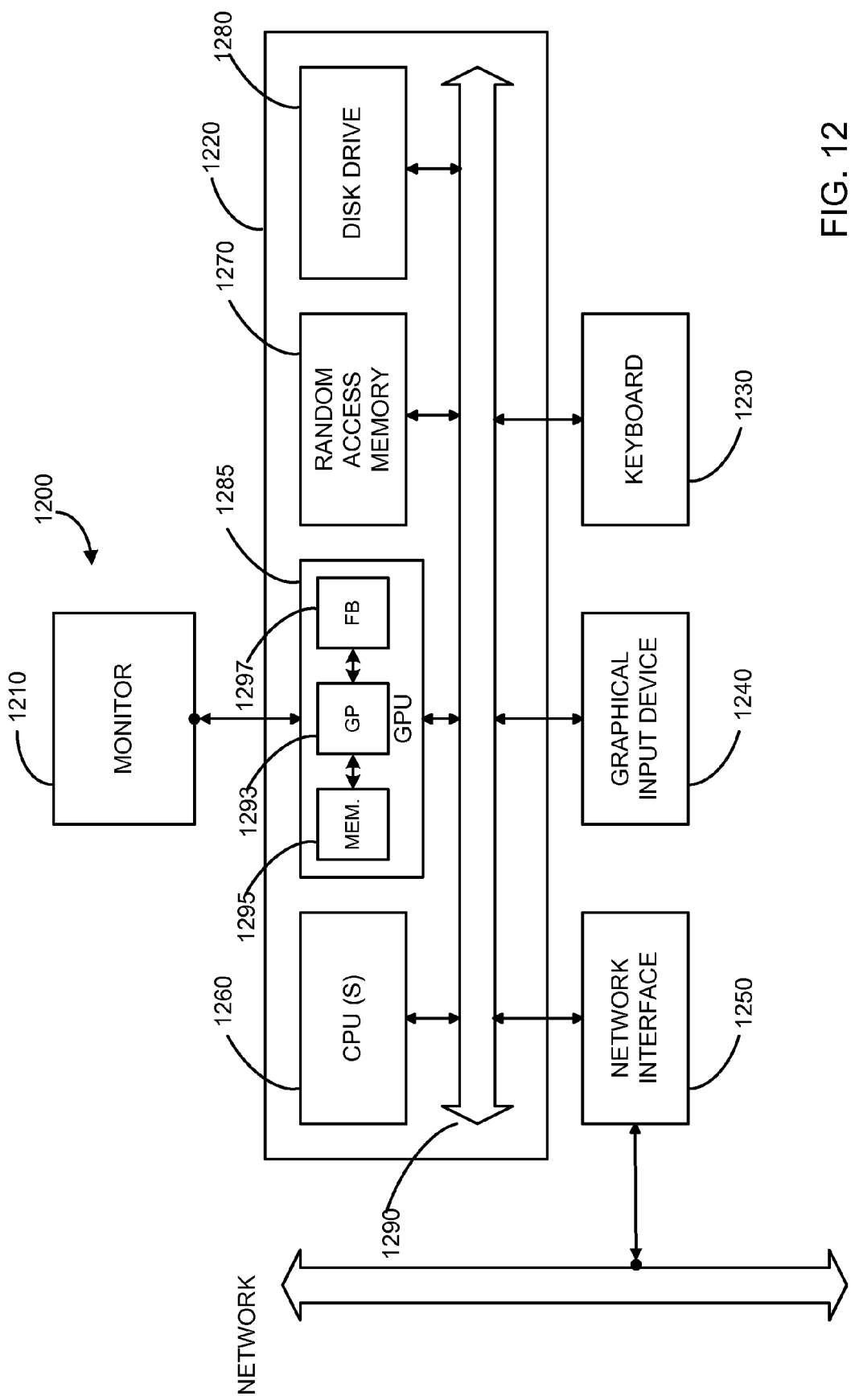
FIG. 12 is a block diagram of a block diagram of a computer system or information processing device that may be used to implement or practice various embodiments of an invention whose teachings may be presented herein.

FIG. 12 is a block diagram of computer system 1200 that may be used to implement or practice various embodiments of an invention whose teachings may be presented herein. FIG. 12 is merely illustrative of a general-purpose computer system or specific information processing device for an embodiment incorporating an invention whose teachings may be presented herein and does not limit the scope of the invention as recited in the claims. One of ordinary skill in the art would recognize other variations, modifications, and alternatives.

In one embodiment, computer system 1200 can include monitor 1210, computer 1220, keyboard 1230, user input device 1240, computer interfaces 1250, or the like. Monitor 1210 may typically include familiar display devices, such as a television monitor, a cathode ray tube (CRT), a liquid crystal display (LCD), or the like. Monitor 1210 may provide an interface to user input device 1240, such as incorporating touch screen technologies.

Computer 1220 may typically include familiar computer components, such as processor 1260 and one or more memories or storage devices, such as random access memory (RAM) 1270, one or more disk drives 1280, graphics processing unit (GPU) 1285, or the like. Computer 1220 may include system bus 1290 interconnecting the above components and providing functionality, such as inter-device communication.

In further embodiments, computer 1220 may include one or more microprocessors (e.g., single core and multi-core) or micro-controllers, such as PENTIUM, ITANIUM, or CORE 2 processors from Intel of Santa Clara, Calif. and ATHLON, ATHLON XP, and OPTERON processors from Advanced Micro Devices of Sunnyvale, Calif. Further, computer 1220 may include one or more hypervisors or operating systems, such as WINDOWS, WINDOWS NT, WINDOWS XP, VISTA, or the like from Microsoft or Redmond, Wash., SOLARIS from Sun Microsystems, LINUX, UNIX, and UNIX-based operating system.

In various embodiments, user input device 1240 may typically be embodied as a computer mouse, a trackball, a track pad, a joystick, a wireless remote, a drawing tablet, a voice command system, an eye tracking system, or the like. User input device 1240 may allow a user of computer system 1200 to select objects, icons, text, user interface widgets, or other user interface elements that appear on monitor 1210 via a command, such as a click of a button or the like.

In some embodiments, computer interfaces 1250 may typically include a communications interface, an Ethernet card, a modem (telephone, satellite, cable, ISDN), (asynchronous) digital subscriber line (DSL) unit, FireWire interface, USB interface, or the like. For example, computer interfaces 1250 may be coupled to a computer network, to a FireWire bus, a USB hub, or the like. In other embodiments, computer interfaces 1250 may be physically integrated as hardware on the motherboard of computer 1220, may be implemented as a software program, such as soft DSL or the like, or may be implemented as a combination thereof.

In various embodiments, computer system 1200 may also include software that enables communications over a network, such as the Internet, using one or more communications protocols, such as the HTTP, TCP/IP, RTP/RTSP protocols, or the like. In some embodiments, other communications software and/or transfer protocols may also be used, for example IPX, UDP or the like, for communicating with hosts over the network or with a device directly connected to computer system 1200.

RAM 1270 and disk drive 1280 are examples of machine-readable articles or computer-readable media configured to store information, such as computer programs, executable computer code, human-readable source code, shader code, rendering enginges, or the like, and data, such as image files, models including geometrical descriptions of objects, ordered geometric descriptions of objects, procedural descriptions of models, scene descriptor files, or the like. Other types of computer-readable storage media or tangible machine-accessible media include floppy disks, removable hard disks, optical storage media such as CD-ROMs, DVDs and bar codes, semiconductor memories such as flash memories, read-only-memories (ROMS), battery-backed volatile memories, networked storage devices, or the like.

In some embodiments, GPU 1285 may include any conventional graphics processing unit. GPU 1285 may include one or more vector or parallel processing units that may be user programmable. Such GPUs may be commercially available from NVIDIA, ATI, and other vendors. In this example, GPU 1285 can include one or more graphics processors 1293, a number of memories and/or registers 1295, and a number of frame buffers 1297.

As suggested, FIG. 12 is merely representative of a general-purpose computer system or specific data processing device capable of implementing or incorporating various embodiments of an invention presented within this disclosure. Many other hardware and/or software configurations may be apparent to the skilled artisan which are suitable for use in implementing an invention presented within this disclosure or with various embodiments of an invention presented within this disclosure. For example, a computer system or data processing device may include desktop, portable, rack-mounted, or tablet configurations. Additionally, a computer system or information processing device may include a series of networked computers or clusters/grids of parallel processing devices. In still other embodiments, a computer system or information processing device may techniques described above as implemented upon a chip or an auxiliary processing board.

Various embodiments of any of one or more inventions whose teachings may be presented within this disclosure can be implemented in the form of logic in software, firmware, hardware, or a combination thereof. The logic may be stored in or on a machine-accessible memory, a machine-readable article, a tangible computer-readable medium, a computer-readable storage medium, or other computer/machine-readable media as a set of instructions adapted to direct a central processing unit (CPU or processor) of a logic machine to perform a set of steps that may be disclosed in various embodiments of an invention presented within this disclosure. The logic may form part of a software program or computer program product as code modules become operational with a processor of a computer system or an information-processing device when executed to perform a method or process in various embodiments of an invention presented within this disclosure. Based on this disclosure and the teachings provided herein, a person of ordinary skill in the art will appreciate other ways, variations, modifications, alternatives, and/or methods for implementing in software, firmware, hardware, or combinations thereof any of the disclosed operations or functionalities of various embodiments of one or more of the presented inventions.

The disclosed examples, implementations, and various embodiments of any one of those inventions whose teachings may be presented within this disclosure are merely illustrative to convey with reasonable clarity to those skilled in the art the teachings of this disclosure. As these implementations and embodiments may be described with reference to exemplary illustrations or specific figures, various modifications or adaptations of the methods and/or specific structures described can become apparent to those skilled in the art. All such modifications, adaptations, or variations that rely upon this disclosure and these teachings found herein, and through which the teachings have advanced the art, are to be considered within the scope of the one or more inventions whose teachings may be presented within this disclosure. Hence, the present descriptions and drawings should not be considered in a limiting sense, as it is understood that an invention presented within a disclosure is in no way limited to those embodiments specifically illustrated.

Accordingly, the above description and any accompanying drawings, illustrations, and figures are intended to be illustrative but not restrictive. The scope of any invention presented within this disclosure should, therefore, be determined not with simple reference to the above description and those embodiments shown in the figures, but instead should be determined with reference to the pending claims along with their full scope or equivalents.

What is claimed is:

1. A method for artistically controlling transfers of information between objects of computer graphics systems, the method comprising:

receiving, at one or more computer systems, information identifying a pair of meshes;

receiving, at the one or more computer systems, information defining a pair of feature curve networks associated with the pair of meshes, wherein at least one feature curve in one feature curve network in the pair of feature curve networks has been authored by a user on one mesh in the pair of meshes in addition to the geometry of the one mesh and is defined to be in curve correspondence with another feature curve in the other feature curve network in the pair of feature curve networks that has been authored by the user on the other mesh in the pair of meshes in addition to the geometry of the other mesh;

generating, with one or more processors associated with the one or more computer systems, a surface correspondence between at least one surface of one mesh in the pair of meshes and at least one surface of the other mesh in the pair of meshes based on curve correspondences between feature curves in the pair of feature curve networks, wherein the surface correspondence maps each location in a set of locations on the at least one surface of the one mesh in the pair of meshes to at least one location in a set of locations on the at least one surface of the other mesh in the pair of meshes; and transferring, with the one or more processors associated with the one or more computer systems, information between the at least one surface of the one mesh in the pair of meshes and the at least one surface of the other mesh in the pair of meshes based on the surface correspondence.

2. The method of claim 1 wherein generating the surface correspondence between the at least one surface of the one mesh in the pair of meshes and the at least one surface of the other mesh in the pair of meshes comprises generating information defining a correspondence between a point on the at least one surface of the one mesh in the pair of meshes and a point on the at least one surface of the other mesh in the pair of meshes.

3. The method of claim 1 wherein generating the surface correspondence between the at least one surface of the one mesh in the pair of meshes and the at least one surface of the other mesh in the pair of meshes comprises extending the curve correspondence between corresponding feature curves in the pair of feature curve networks to the surface correspondence based on one or more harmonic functions.

4. The method of claim 1 wherein receiving the information defining the pair of feature curve networks associated with the pair of meshes comprises receiving input from the user defining at least one feature curve by at least one point that lies within the interior of a face associated with one mesh in the plurality of meshes.

5. The method of claim 1 wherein receiving the information defining the pair of feature curve networks associated with the pair of meshes comprises receiving a region definition wherein at least one region associated with one mesh in the pair of meshes is bounded by more than three or less than three feature curves in the pair of feature curve networks.

6. The method of claim 1 wherein transferring the information between the at least one surface of the one mesh in the pair of meshes and the at least one surface of the other mesh in the pair of meshes comprises transferring a weighted portion of data associated with at least one mesh.

7. The method of claim 1 wherein transferring the information between the at least one surface of the one mesh in the pair of meshes and the at least one surface of the other mesh in the pair of meshes comprises transferring one or more of articulation data, shader data, lighting data, simulation data, geometry, re-meshing information, or map information.

8. A non-transitory computer readable medium storing computer-executable code for artistically controlling transfers of information between objects of computer graphics systems, the non-transitory computer readable medium comprising:
 code for receiving a pair of meshes;
 code for receiving information defining a pair of feature curve networks associated with the pair of meshes, wherein at least one feature curve in one feature curve network in the pair of feature curve networks has been authored by a user on one mesh in the pair of meshes in addition to the geometry of the one mesh and is defined to be in curve correspondence with another feature curve in the other feature curve network in the pair of feature curve networks that has been authored by the user on the other mesh in the pair of meshes in addition to the geometry of the other mesh;
 code for generating a surface correspondence between at least one surface of one mesh in the pair of meshes and at least one surface of the other mesh in the pair of meshes based on curve correspondences between feature curves in the pair of feature curve networks, wherein the surface correspondence maps each location in a set of locations on the at least one surface of the one mesh in the pair of meshes to at least one location in a set of locations on the at least one surface of the other mesh in the pair of meshes; and
 code for transferring information between the at least one surface of the one mesh in the pair of meshes and the at least one surface of the other mesh in the pair of meshes based on the surface correspondence.

9. The non-transitory computer readable medium of claim 8 wherein the code for generating the surface correspondence between the at least one surface of the one mesh in the pair of meshes and the at least one surface of the other mesh in the pair of meshes comprises code for generating information defining a correspondence between a point on the at least one surface of the one mesh in the pair of meshes and a point on the at least one surface of the other mesh in the pair of meshes.

10. The non-transitory computer readable medium of claim 8 wherein the code for generating the surface correspondence between the at least one surface of the one mesh in the pair of meshes and the at least one surface of the other mesh in the pair of meshes comprises code for extending the curve correspondence between corresponding feature curves in the pair of feature curve networks to the surface correspondence based on one or more harmonic functions.

11. The non-transitory computer readable medium of claim 8 wherein the code for receiving the information defining the pair of feature curve networks associated with the pair of meshes comprises code for receiving input from the user defining at least one feature curve by at least one point that lies within the interior of a face associated with one mesh in the plurality of meshes.

12. The non-transitory computer readable medium of claim 8 wherein the code for receiving the information defining the pair of feature curve networks associated with the pair of meshes comprises code for receiving a region definition wherein at least one region associated with one mesh in the pair of meshes is bounded by more than three or less than three feature curves in the pair of feature curve networks.

13. The non-transitory computer readable medium of claim 8 wherein the code for transferring the information between the at least one surface of the one mesh in the pair of meshes and the at least one surface of the other mesh in the pair of meshes comprises transferring a weighted portion of data associated with at least one mesh.

14. The non-transitory computer readable medium of claim 8 wherein the code for transferring the information between the at least one surface of the one mesh in the pair of meshes and the at least one surface of the other mesh in the pair of meshes comprises code for transferring one or more of articulation data, shader data, lighting data, simulation data, geometry, re-meshing information, or map information.

15. A method for transferring information between objects, the method comprising:
 receiving, at one or more computer systems, information identifying a first mesh;
 receiving, at the one or more computer systems, information defining a first feature curve network associated with the first mesh;
 receiving, at the one or more computer systems, information identifying a second mesh;
 receiving, at the one or more computer systems, information defining a second feature curve network associated with the second mesh;
 receiving, at the one or more computer systems, information specifying a correspondence for each feature curve in the first feature curve network between the feature curve and at least one feature curve in the second feature curve network, wherein at least one pair of corresponding feature curves has been manually authored on the surface interiors of the first and second mesh;
 generating, with one or more processors associated with the one or more computer systems, a correspondence between the first and second meshes using one or more harmonic functions in response to the first feature curve network associated with the first mesh and the second feature curve network associated with the second mesh; and
 transferring, with the one or more processors associated with the one or more computer systems, information between the first and second meshes based on the correspondence between the first and second meshes.

16. The method of claim 15 wherein the second mesh comprises the first mesh.

17. The method of claim 15 wherein receiving the information defining the first or second feature curve networks comprises receiving a feature curve authored on a mesh to have at least one point that lies in the interior of a face associated with the mesh.

18. The method of claim 15 further comprising:
 updating an object in response to transferring the information between the first mesh and the second mesh based on the correspondence between the first mesh and the second mesh.

19. A non-transitory computer readable medium storing computer-executable code for transferring information between objects, the non-transitory computer readable medium comprising:

code for receiving information identifying a first mesh;

code for receiving information defining a first feature curve network associated with the first mesh;

code for receiving information identifying a second mesh;

code for receiving information defining a second feature curve network associated with the second mesh;

code for receiving information specifying a correspondence for each feature curve in the first feature curve network between the feature curve and at least one feature curve in the second feature curve network, wherein at least one pair of corresponding feature curves has been manually authored on the surface interiors of the first and second mesh;

code for generating a correspondence between the first mesh and the second mesh using one or more harmonic functions in response to the first feature curve network associated with the first mesh and the second feature curve network associated with the second mesh; and code for transferring information between the first and second meshes based on the correspondence between the first and second meshes.

20. The non-transitory computer readable medium of claim 19 wherein the second mesh comprises the first mesh.

21. The non-transitory computer readable medium of claim 19 wherein the code for receiving the information defining the first or second feature curve networks comprises code for receiving a feature curve authored on a mesh to have at least one point that lies in the interior of a face associated with the mesh.

22. The non-transitory computer readable medium of claim 19 further comprising:

code for updating an object in response to transferring the information between the first mesh and the second mesh based on the correspondence between the first mesh and the second mesh.

23. A method for transferring information between objects, the method comprising:

receiving, at one or more computer systems, information identifying a first mesh and a second mesh;

receiving, at the one or more computer systems, information defining a pair of feature curve networks associated with the first mesh and the second mesh, at least one feature curve in the pair of feature curve networks authored with a point that lies in the interior of a face associated with one of the first mesh or the second mesh, each feature curve in one feature curve network in the pair of feature curve networks in correspondence with at least one feature curve in the other feature curve network in the pair of feature curve networks;

generating, with one or more processors associated with the one or more computer systems, a correspondence between the first mesh and the second mesh based on the pair of feature curve networks; and transferring, with the one or more processors associated with the one or more computer systems, information between the first mesh and the second mesh based on the correspondence between the first mesh and the second mesh.

24. The method of claim 23 wherein generating the correspondence between the first mesh and the second mesh comprises generating the correspondence based on one or more harmonic functions.

25. The method of claim 23 wherein transferring the information between the first mesh and the second mesh based on the correspondence between the first mesh and the second mesh comprises transferring geometry between the first mesh and the second mesh.

26. The method of claim 23 further comprising re-meshing based on the correspondence between the first mesh and the second mesh.

\* \* \* \* \*